United States Patent
Demuth et al.

(10) Patent No.: US 9,600,795 B2
(45) Date of Patent: Mar. 21, 2017

(54) MEASURING PROCESS MODEL PERFORMANCE AND ENFORCING PROCESS PERFORMANCE POLICY

(75) Inventors: Steve Demuth, Decorah, IA (US);
Aliza R. Heching, Bronx, NY (US);
Jimeng Sun, White Plains, NY (US);
Judah M. Diament, Bergenfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 13/442,462

(22) Filed: Apr. 9, 2012

(65) Prior Publication Data

US 2013/0268251 A1    Oct. 10, 2013

(51) Int. Cl.
*G06Q 10/06* (2012.01)
*G06N 5/04* (2006.01)
*G06N 5/00* (2006.01)
*G06F 17/30* (2006.01)

(52) U.S. Cl.
CPC .......... *G06Q 10/067* (2013.01); *G06Q 10/06* (2013.01); *G06F 17/30864* (2013.01); *G06N 5/00* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 6,957,208 B1 * | 10/2005 | Boucher et al. | 706/55 |
| 7,480,640 B1 * | 1/2009 | Elad et al. | 706/14 |
| 7,818,277 B2 * | 10/2010 | Rouvellou et al. | 706/47 |
| 2004/0158567 A1 * | 8/2004 | Dettinger et al. | 707/100 |
| 2004/0215599 A1 * | 10/2004 | Apps et al. | 707/2 |
| 2005/0060332 A1 * | 3/2005 | Bernstein et al. | 707/100 |
| 2006/0294095 A1 * | 12/2006 | Berk et al. | 707/6 |
| 2008/0249817 A1 * | 10/2008 | Nauck et al. | 705/7 |
| 2010/0004923 A1 * | 1/2010 | Bogl et al. | 704/9 |
| 2010/0083215 A1 * | 4/2010 | Bogl et al. | 717/105 |
| 2011/0106801 A1 * | 5/2011 | Srivastava et al. | 707/737 |
| 2011/0153311 A1 * | 6/2011 | Bogl et al. | 704/9 |

OTHER PUBLICATIONS

Livshits, et al, "DynaMine: Finding Common Error Patterns by Mining Sofware Revision Histories," ESEC-FSE '05, Sep. 5-9, 2005, Lisbon, Portugal, pp. 296-305, Copyright 2005 ACM.*
Cabac, et al, "Net Components for the Integration of Process Mining into Agent-Oriented Software Engineering," ToPNoC I, LNCS 5100, pp. 86-103, Copyright Springer-Verlag, 2008.*

(Continued)

*Primary Examiner* — Aniss Chad
*Assistant Examiner* — David M Rogers
(74) *Attorney, Agent, or Firm* — Scully, Scott, Murphy & Presser, P.C.; Louis J. Percello, Esq.

(57) ABSTRACT

Common sub-process patterns in a plurality of deployed process models may be discovered, and performance measures associated with the sub-process patterns may be computed based on runtime events of the deployed process models. Positive or negative performance patterns among sub-process patterns may be identified and used for creating new process models or improving existing process models.

25 Claims, 9 Drawing Sheets

(56) References Cited

OTHER PUBLICATIONS

Cook, et al, "Discovering Models of Behavior for Concurrent Workflows," Computers in Industry, vol. 53, (2004), pp. 297-319.*
Yan, et al, "CloseGraph: Mining Closed Frequent Graph Patterns," SIGKDD'03, Washington, DC, Copyright 2003 ACM.*
Akman, et al,"Applicability of Process Discovery Algorithms for Software Organizations," 35th Euromicro Conference on Software Engineering and Advanced Applications, 2009, pp. 195-.*
T. Isakowitz, "Supporting search for reusable software objects." Software Engineering, IEEE Transactions on 22, No. 6 (1996), pp. 407-423.*
P. Constantopoulos, "Repositories for Software Reuse: The Software Information Base." In Information System Development Process, 1993, pp. 285-307.*
Thread Debugging with GDB, on the Web at http://sourceware.org/gdb/onlinedocs/gdb/Threads.html dated by the Wayback Archive to Dec. 6, 2010, 3 pages.*
Faramarz Safi Esfahani et al."A Case Study of the Intelligent Process Decentralization Method" Proceedings of the World Congress on Engineering and Computer Science vol. 1, WCECS Oct. 20-22, 2009 San Francisco CA.
Shaofei Wu "A New Frequent Path Algorithm of Web User Access Pattern" Industrial and Information Systems, 2009. IIS '09. International Conference on International Conference on Industrial and Information Systems pp. 80-82, Apr. 24-25, 2009.
Yan, Xifeng, and Jiawei Han. " gSpan: Graph-based substructure pattern mining." Procof the 2nd International conference on Data Mining 0.d (2002) : 721.
Yan, X, and J Han. "CloseGraph: mining closed frequent graph patterns." Proceedings of the ninth ACM SIGKDD international conference on Knowledge discovery and data mining. ACM, 2003. 286-295.

* cited by examiner

MEASURING PROCESS MODEL PERFORMANCE AND ENFORCING PROCESS PERFORMANCE POLICY

FIELD

The present application relates generally to computers, and computer applications, and more particularly to measuring and predicting performance and enforcing performance policy for process models.

BACKGROUND

Large enterprises have many modeled processes and potentially many instances of each process. Sub-process patterns that are common across multiple processes in the enterprise may exist but may not be identified as such. Furthermore, while the similar sub-process patterns may exist in multiple processes, they may not have the same performance measure or efficiency. For instance, a sub-process pattern that works well in one process model may not perform as well in another process model. More concretely, the same set of tasks executed in a first project that worked well in completing that first project may not work as well in a different second project. Regardless, without knowing the difference in the performance results, the same set of tasks may be used for the different second project. Thus, applicants in the present disclosure have recognized that identifying similar patterns and also determining their performance measures in different projects or process model contexts would be valuable.

BRIEF SUMMARY

Methods and systems for process model performance measurement and process performance policy enforcement may be provided. A method for process model performance measurement and process performance policy enforcement, in one aspect, may include receiving a deployed process model. The method may also include discovering a common sub-process pattern in the deployed process model that is in common with at least one previously discovered sub-process pattern in a previously deployed process model. The method may further include receiving one or more events associated with a runtime instance of the deployed process model. The method may also include computing performance measurement associated with the discovered common sub-process pattern based on the received one or more events.

A system for process model performance measurement and process performance policy enforcement, in one aspect, may include a process analyzer operable to execute on a processor and further operable to discover a common sub-process pattern in a deployed process model that is in common with at least one previously discovered sub-process pattern in a previously deployed process model. The process analyzer module may be further operable to receive one or more events associated with a runtime instance of the deployed process model, and compute performance measurement associated with the discovered common sub-process pattern based on the received one or more events. The process analyzer may discover a plurality of common sub-process patterns in a plurality of deployed process models and computes performance measurement associated with each of the plurality of common sub-process patterns. The process analyzer may identify negative performance patterns and positive performance patterns among the plurality of common sub-process patterns based on the computed performance measurement.

In another aspect, a system for process model performance measurement and process performance policy enforcement may include a modeler operable to create a process model and one or more policies associated with the process model. A process server may be operable to deploy and execute the process model. The process server may be further operable to fire one or more events associated with runtime execution of the process model. A process analyzer may be operable to discover a sub-process pattern in the process model that is common with previously discovered sub-process pattern. The process analyzer may be further operable to compute a performance measure associated with the discovered sub-process pattern based on the fired one or more events. The modeler may further use the discovered sub-process pattern and associated performance measure to create a new process model, or improve an existing process model, or combinations thereof. The process server may further enforce the one or more policies based on the computed performance measure.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Methodologies and system components may be provided that measure process model performance and enforce process performance policy. An embodiment of the present disclosure may discover sub-process patterns present in multiple process models and use those patterns to (i) predict negative process performance in new process models, e.g., failures, delays, and/or others, (ii) predict positive process performance in new process models, e.g., delivery below cost, shorter execution time to completion, and/or other, and (iii) facilitate standardization and/or improvement of process models. Performance measurements may be also used to affect process execution at runtime via policies.

Identifying common sub-process patterns and predicting their performance along various performance dimensions may facilitate process creation and execution. For example, discovery of statistically outlying negative performance (e.g., failures and delays) associated with a given pattern and improving all affected processes, discovery of statistically outlying positive performance (e.g., delivery prior to due date, delivery below cost) associated with a given pattern and the possibility to use it as a benchmark, avoidance of the creation of new failure/delay prone processes by estimating likelihood of process failure and delay may be facilitated. Furthermore, such identifying of common sub-process patterns may encourage creation of new positively performing processes by estimating likelihood of a process performing well, facilitate standardization of common processes conforming to a common sub-process pattern and defining of runtime policies that reference expected and/or actual performance of all or part of a process and altering process behavior based on performance requirements. At process execution time, enforcement and execution of runtime policies that reference expected and/or actual performance of all or part of a process and altering of process behavior based on performance requirements may be facilitated.

The positive or negative performance characteristics of a pattern may be due to any number of factors such as their use of a given service, composition of two services that individually perform well but when composed together perform poorly, the inefficiency of a given human task, poor interaction between two human tasks or actors, and other factors. Such discovery of positive and/or negative performance of a given pattern may also provide a narrower scope within which to investigate performance issues and values against which performance policies can be evaluated.

Figure 1:
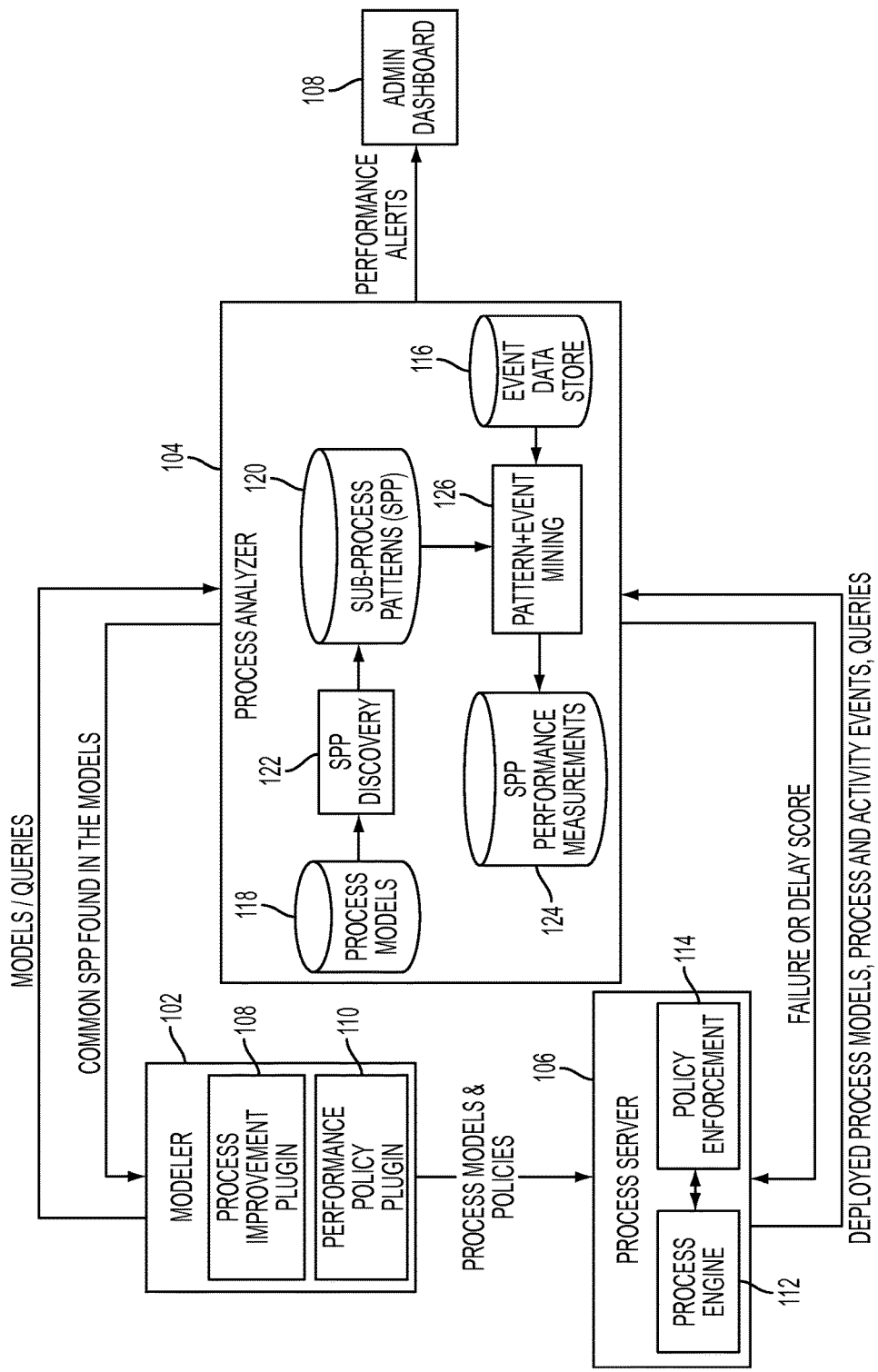
FIG. 1 is a system diagram illustrating components of the present disclosure in one embodiment.

FIG. 1 is a system diagram illustrating components of the present disclosure in one embodiment. A modeler 102 may be a tool, for example, used by humans, to create process models and add the models to a process execution server 106. A process model includes one or more steps or tasks, for example, which are to be executed for achieving an objective, job or project or the like.

In one embodiment of the present disclosure, functionality may be provided in a modeler tool, for instance, as a plugin or another modular component. For instance, a process improvement plugin (PIP) 108 may be a plugin to the modeler 102 or the like module or functionality used to analyze one or more models for negative and/or positive performance patterns and reuse opportunities. An example of a negative performance pattern may be a set of tasks (sub-process pattern) in a process model occurring together which produce negative impact or result on the overall execution of the process model. An example of a positive performance pattern may be a set of tasks (sub-process pattern) in a process model occurring together which produce positive impact or result on the overall execution of the process model.

The process improvement plugin 108 may identify new sub-processes in a process model, for example, created via the modeler 102, that are likely to perform positively or negatively, for instance those sub-processes that are like to fail, have a delay in execution, incur low cost in execution, or have early completion, or other positive or negative impact. The process improvement plugin 108 may show existing sub-process patterns to which sub-processes in a new model conform, display a sub-process pattern, and all deployed models that conform to it. The functionalities of the process improvement plugin 108 may facilitate the removal of failure and delay prone patterns from process models, the inclusion of patterns that perform well, and sub-process standardization and reuse.

A performance policy plugin (PPP) 110 may be a plugin to the modeler 102 or the like module or functionality used to define one or more policies to be enforced on one or more processes at execution time. Generally, policies reference process models and their performance dimensions and dictate how a process should behave in light of various performance situations. A dimension refers to an aspect or characteristic. A performance dimensions refer to a performance measure related to particular aspect or characteristic of a process model. An example of performance dimension may be "time to completion" of a process. Another example of performance dimension may be "CPU cycles" it takes to execute, e.g., of a task or sub-process in the process model. Yet another example of performance dimension may be "how long it took for a human or another to respond to a task".

The process execution server 106 may receive one or more process models and execute them on a processor or the like. An executing process model is referred to as an instance of that process model. The process execution server 106 may include a process engine (PRE) 112 module or functionality and a policy enforcement module or functionality 114 to carry out its functions.

The process engine (PRE) 112 may include server software or the like module or functionality which executes process models and fires or generates events describing the process execution. For example, the process engine 112 may generate signals of events upon one or more of the start, stop, or failure of execution, other exceptions, or configured events occurring in each sub-process or task contained in each instance of each process model. A user, for example, may configure or specify what events to look for in the executing process model or sub-processes of the executing process model. Upon detecting those events, the process engine 112 may fire those events (generate a signal or like) to provide notification to another processing component, e.g., a process analyzer 104.

The policy enforcement (PE) 114 may include a module or the like functionality that listens to events from the PRE 112, calculates one or more relevant performance values in real time, and enforces policies in concert with PRE. For example, a relevant performance value may be the time to completion of a sub-process, and a policy that is enforced may be substituting an alternate task for that sub-process if the time to completion was determined to be longer than specified in the policy.

A process analyzer 104 may receive one or more deployed process models and events from a process execution runtime at 106, and mine the process models to discover common sub-process patterns. The process analyzer 104 may track defined negative and positive performance (e.g., failures, delays, below cost delivery) associated with sub-process patterns, and determine likelihood of negative and positive performance patterns in new models to help predict performance.

In one embodiment of the present disclosure, the functionalities of the process analyzer 104 may be implemented in server software containing the following components, modules or functionality. An event data store 116 may store events fired or generated by the process execution server 106. Process models 118 may include selected or all process models deployed in the process execution server 106. Sub-process patterns (SPP) 120 may include sub-process patterns discovered in at least two deployed process models. The SPP component 120 may contain both the discovered sub-process patterns, and a member list for each sub-process pattern which lists process models in which the sub-process pattern appears.

An SPP discovery module 122 may analyzes process models 118 to discover sub-process patterns. In one embodiment of the present disclosure, any known or will be known text analysis and/or search algorithms may be utilized to discover the patterns.

An SPP performance measurements module 124 may be created from the combination of sub-process patterns and events. For each sub-process pattern, statistical data such as a probability distribution may be calculated for each of the different types of positive and negative performance dimensions being monitored. A performance dimension refers to an aspect of performance, for instance, of interest, such as time to completion, central process unit (CPU) overhead, memory usage, and/or others.

A pattern and event mining module 126 may mine the combination of events in event data store 116 and sub-process patterns 120 to discover the existence of negative and/or positive performance patterns in one or more processes (process models) being monitored. A performance pattern refers to a pattern of behavior being exhibited with respect to a performance dimension. For example, one may discover that all processes that conform to sub-process pattern X exhibit poor performance with respect to CPU overhead. In one embodiment of the present disclosure, any known or will be known techniques or algorithms may be utilized for mining the data to discover the performance patterns.

An administrator dashboard module may be a user interface component or functionality that is enabled to display or otherwise present the data such as the list of sub-processes, performance measures associated with the sub-processes and other data, as well as performance alerts or events.

The modeler component 102, the process server component 106 and the process analyzer component 108, in one embodiment, may function together in a feedback/looping manner. For example, a modeler component 102 may provide process models and policies to deploy to the process server 106. Specification of criteria for generating or firing events may be also included in the policies. The process server 106 may send copies of the deployed process models to the process analyzer 104 for analysis. The process server 106 may also send event notifications about the specified events occurring in the deployed process model during its runtime to the process analyzer 104. The process analyzer 104 may discover sub-process patterns in the process models and compute performance measures associated with sub-process patterns based on the events occurring during the runtime of process models that include or conform to those sub-process patterns. The process analyzer 104 may send the computed performance measurements associated with sub-processes to the process server 106 for policy enforcements. The process analyzer 104 may also send a list of discovered sub-process patterns to the modeler 102 for use during creation or updating of process models.

Figure 2:
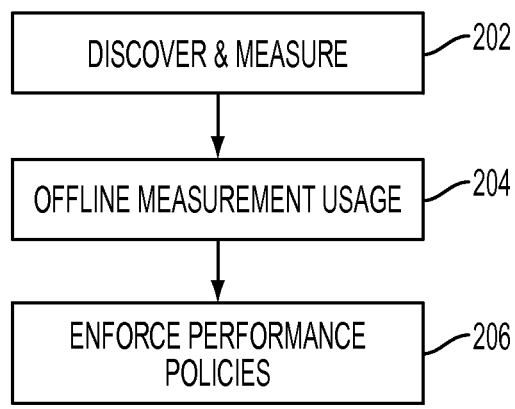
FIG. 2 illustrates an overview of a methodology in one embodiment disclosure.

FIG. 2 illustrates an overview of a methodology in one embodiment of the present disclosure. At 202, a method in one embodiment of the present disclosure may include discovering and measuring. For example, common sub-process patterns among two or more process models may be discovered in process models. Performance measurements may be assigned to the discovered sub-process patterns, for example, for a number of different performance dimensions. The measurements may be further updated. The measurements in one embodiment are computed based on one or more events generated by a process engine when executing the process models conforming to the sub-process patterns.

At 204, offline measurement usage may take place. Offline measurement usage may occur as after-the-fact performance analyses of sub-process patterns. Results of the analysis help in creation and recreation of process models as well as in problem analysis and capacity planning. Performance of new process models may be predicted based on previous performance measurements associated with sub-process patterns that may appear in the new process models. Those sub-process patterns considered to have good performance results may be reused or recreated in other process models. Those sub-process patterns identified as poorly performing sub-process patterns may be refrained or removed from being deployed or executed.

At 206, performance policies may be enforced, for example, in real time. For example, policies may be created that define acceptable performance along one or more performance dimensions, for instance, for performance analysis. Policies may be also defined that specify how a process engine should react at runtime to a given set of performance realities that are dictated by sub-process pattern performance. Based on the policies, the process engine may generate appropriate events. The performance policies may be enforced at runtime of one or more process models.

Figure 3:
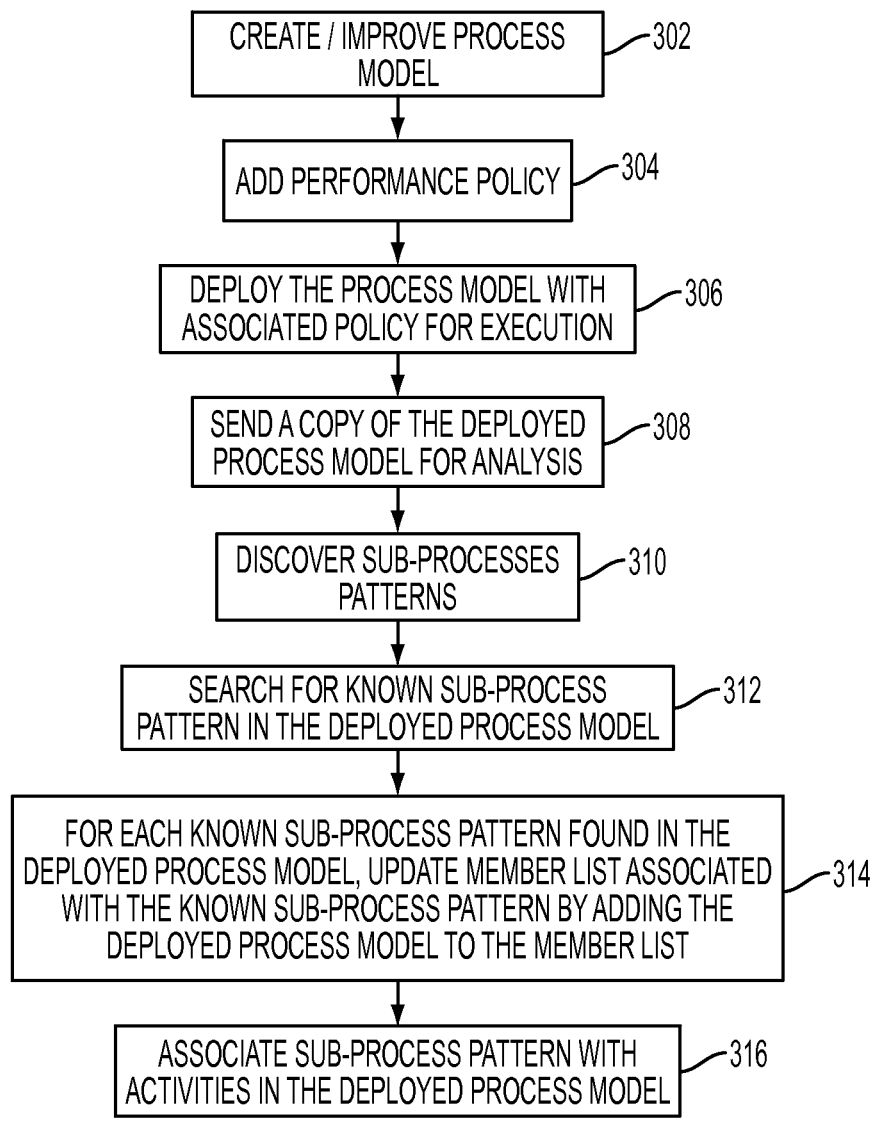
FIG. 3 illustrates methodologies involved in discovering and measuring procedures of the present disclosure in one embodiment.

FIG. 3 illustrates methodologies involved in adding and discovering procedures of the present disclosure in one embodiment. For example, a new model may be added. For instance, as shown at 302, a user may create a process model using a modeler tool and may improve the created model using a process improvement plugin or like module.

At 304, a user may add one or more performance policies associated with the created process model, for instance, using a performance policy plugin or the like module.

At 306, a modeler may deploy the new model and associated one or more policies into a process execution server. At 308, the process execution server may send a copy of the process model to a process analyzer. At 310, the process analyzer may save the process model and perform discovering of all sub-process patterns in the new model, for instance, by calling an SPP discovery component or functionality. At 312, the SPP discovery component may search for previously known sub-process patterns. At 314, for each previously known sub-process pattern found in the new process model, the new process model may be added to the member list of the sub-process pattern. At 316, the sub-process pattern may be also associated with the activities in the process model that reify it. For example, a process model may comprise a flow of activities with each activity represented as a component in the flow. For instance, consider a representation of a process model such as a flow chart or the like, with each box/shape/task in the flowchart diagram being called an "activity". Consider also a simple flowchart with four activities, one connected to the next-[1]->[2]->[3]->[4]. An example of activity [2] may be "get product details from DB", an example of activity [3] may be "automatically analyze market value of the product", and an example of activity [4] may be "compare the product cost listed in DB to market value". This set of activities ([2]->[3]->[4]) in this order may be a pattern that occurs in many different product sales process models. Once it is observed that this pattern exists in at least two models, the methodology in one embodiment of the present disclosure recognizes it as a sub-process pattern (e.g., referred to here as SPP1). In this example, the 3 activities ([2]->[3]->[4]) reify SPP1, and as such are considered to be associated with SPP1. Knowing that it is specifically those activities ([2]->[3]->[4]) that reify SPP1 allows the methodology of the present disclosure, for example, to associate any events that occur in ([2]->[3]->[4]) with SPP1, and/or highlight those activities ([2]->[3]->[4]) in the modeler tool, for instance, to enable the user to see all examples of SPP1.

In one aspect, adding a new process model may introduce one or more new sub-process patterns, as the new process model and one other existing process model may share one or more sub-process patterns. In this case, the new process model and the one other existing process model which also uses the same sub-process pattern may be added to the member list of the new sub-process pattern.

In another aspect, analyzing of the newly created models to discover common sub-process patterns in the existing process models may be performed at a set time or time intervals, which may be configurable. Such timed analyzing may be useful in cases where analyzing the new model against the complete set of existing process models for patterns may become expensive to do each time a new process model is added. Therefore, a system and/or methodologies of the present disclosure in one embodiment may be configured to periodically rebuild a sub-process pattern data store or database at set intervals and/or according to other criteria, for example, when a given number of new models has been added.

Figure 4:
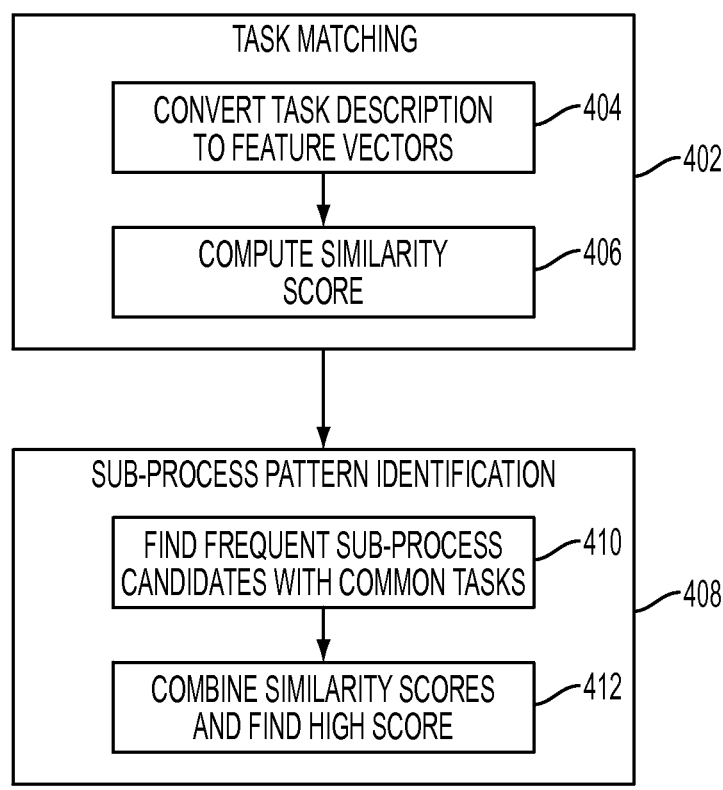
FIG. 4 illustrates a sub-process pattern discovery in one embodiment of the present disclosure.

FIG. 4 illustrates a sub-process pattern discovery in more detail in one embodiment of the present disclosure. A task is an atomic activity that includes a name and description. A process is a set of tasks interconnected through dependencies. A sub-process pattern is a pattern which exists in at least two process models, where the sub-processes that conform to the pattern are similar but not necessarily identical. A pattern may comprise two or more tasks occurring together, where, taken together, this set of tasks displays one or more defining characteristics. Patterns can have a wide range of defining characteristics, including but not limited to: a sequence of a set of tasks, an occurrence of a set of tasks, appearance of task names, occurrence of tasks and/or task names within a distance of each other in the process model, and/or other characteristics. Two sub-processes conforming to a given pattern need not be identical, but exhibit the characteristics that define the pattern.

At 402, task matching is performed. Input to the task matching may include the tasks to be matched, for example, task A and task B. Output to the task matching may be a similarity score between the matched tasks, for example, task A and task B. The tasks may be matched, for example, by converting descriptions of task A and task B into feature vectors at 404. For example, keywords from the descriptions may be extracted and used to construct a word vector. At 406, similarity score between the two feature vectors of task A and task B may be computed. For instance, the similarity score may be based on hamming distance between two binary feature vectors.

At 408, sub-process pattern (SPP) identification may be performed. For example, a structure matching may be performed at 410, which may include representing processes as graphs, where nodes in those graphs are tasks and edges are dependencies among those tasks. Structure matching may then find frequent sub-process candidates with common tasks, for instance, using frequent sub-graph mining, e.g., gSpan algorithm. At 412, task matching may be performed which may include combining the similarity scores of all corresponding tasks into global similarity scores and finding those sub-processes with high global scores as the common sub-processes. A global score may be considered "high" if, for example, it meets a threshold value. Such threshold value may be defined and/or may be configurable. For example, in response to finding two or more structures that match, task matching may be performed to find tasks that appear in the matched structures, and the tasks' similarity scores may be calculated. For instance, consider that five matching structures are identified as a result of the structure matching performed at 410. For each of the five matching structures, a similarity score may be computed for each task in the matching structure. For each of the five matching structures, the similarity scores of the tasks in a matching structure may be added to generate a global score for that matching structure. Whichever of the five matching structures that have a global score that is greater than or equal to the threshold may be considered to be an instance of the pattern.

In one embodiment of the present disclosure, a sub-process pattern performance may be measured as a probability distribution of the sub-process pattern performance along a given performance dimension. A process execution server (e.g., FIG. 1 106) may fire events to a process analyzer (e.g., FIG. 1 104) when processes and activities start, finish, fail, or upon occurrence of other events during the execution of the process models. In one embodiment, the generating or firing of events may be turned on and off globally for all process models as well as locally for individual process models or instances of process models conforming to a given pattern on a case-by-case basis. Whether and/or when to turn the eventing on and off, globally or locally on a process model or instance of a process model basis, may be configurable.

Each event may include a description of the event, a process model identification (ID), a process instance ID, and an activity ID for activity events. Temporal events are those that are associated with timing such as delays in execution, early completion and other time related events. Temporal events may be calculated by comparing the time elapsed between start and finish events to an expected execution time.

Each event (simple or calculated) may be categorized by the process analyzer (e.g., FIG. 1 104) as impacting zero or more performance dimensions positively or negatively. Events that impact at least one performance dimension may be stored in an events data store (e.g., FIG. 1 116). The stored events are used to calculate and/or recalculate performance probability distributions.

Figure 5:
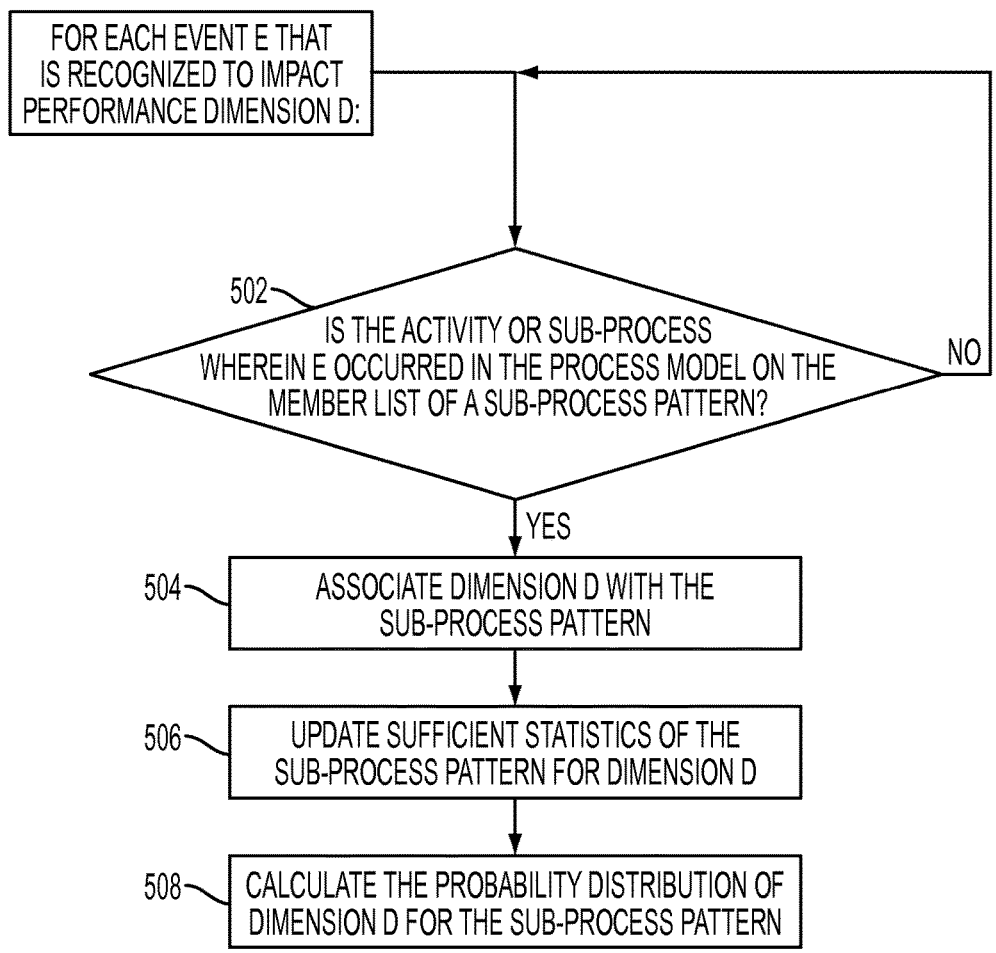
FIG. 5 illustrates an example of how a performance probability distribution may be computed in one embodiment of the present disclosure.

FIG. 5 illustrates an example of how the performance probability distribution may be computed in one embodiment of the present disclosure. At 502, for each event E that is recognized to impact performance dimension D, check if the activity or sub-process wherein E occurred in the process model is on the member list of a sub-process pattern. The member list, for example, may include information that tells exactly where a given pattern appears. For instance, consider an example pattern that has three activities in a given order. Those three activities may appear alone as an entire process model, in which case the process model would be on the member list. Those three activities may also be a subset or sub-process of an arbitrarily large process model, in which case the member list would specify these specific three activities in the process model.

If the activity or sub-process wherein E occurred in the process model is on the member list of a sub-process pattern, at 504, associate dimension D with the sub-process pattern, for instance, if not already associated. At 506, using the event values in the events data store (e.g., FIG. 1 116), update the sufficient statistics of the sub-process pattern for dimension D. Briefly, in statistics, a sufficient statistic refers to a statistic that provides all the relevant information needed to estimate or infer a value of a parameter or probability distribution (see e.g., http://en dot wikipedia dot org/wiki/Sufficient_statistic).

At 508, calculate the probability distribution of dimension D for the sub-process pattern. The probability distribution shows the probability of the sub-process pattern performing in a certain way along a particular performance dimension. The information shown in the distribution may depend on what performance is being measured. In one aspect, the distribution may provide a curve which represents the performance of all the sub-processes to date that reify a pattern, for instance, so that the user is given more than a single score for this pattern along a dimension. For example, the probability distribution showing on-time completion a measure dimension, it may be observed that 25% of the sub-processes finished early, 50% finished on time, and 25% finished late.

Figure 6:
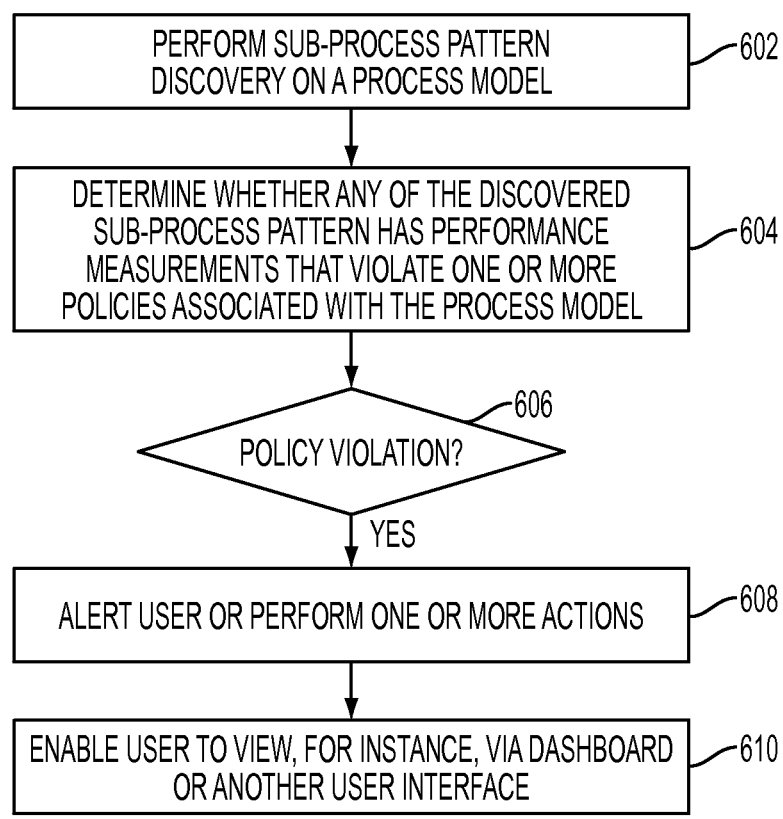
FIG. 6 illustrates predicting performance in one or more new process models in one embodiment of the present disclosure.

Offline measurement usage (e.g., FIG. 2 at 204) in one embodiment of the present disclosure may include predicting performance in one or more new process models. FIG. 6 illustrates predicting performance in one or more new process models in one embodiment of the present disclosure. For example, at 602, each time a user saves a process model or explicitly requests it, the PIP (e.g., FIG. 1 108) may perform SPP discovery on the model. This can be done either locally by the PIP, or via a query to the process analyzer (e.g., FIG. 1 104). At 604, it is determined whether any performance measurement of a process model violates a defined performance policy. At 606, if any performance measurement of a process model violates a defined performance policy, at 608, a user may be alerted. For example, the PIP (e.g., FIG. 1 108) may alert the user by, for instance, highlighting the relevant SPP in new process model. At 610, a user may be enabled to view or further understand the other process models, e.g., stored in the process analyzer (e.g., FIG. 1 104) that reify the same SPP in order to understand precisely where and/or under what situations the violation occurs.

In another aspect, an entity that is executing the process models, e.g., the process execution server (e.g., FIG. 1 106) can be configured to query, e.g., the process analyzer (e.g., FIG. 1 104) for the performance measurements of a newly deployed process model and accept or reject deployment of processes that contain SPPs which violate a performance policy. For example, the process analyzer in receiving the query may search its SPP performance measurements data store for performance data associated with sub-process patterns of the newly deployed process model, and report back to the process execution server. Based on the report, the process execution server may accept or reject deployment of processes that contain SPPs which violate a performance policy.

Figure 7:
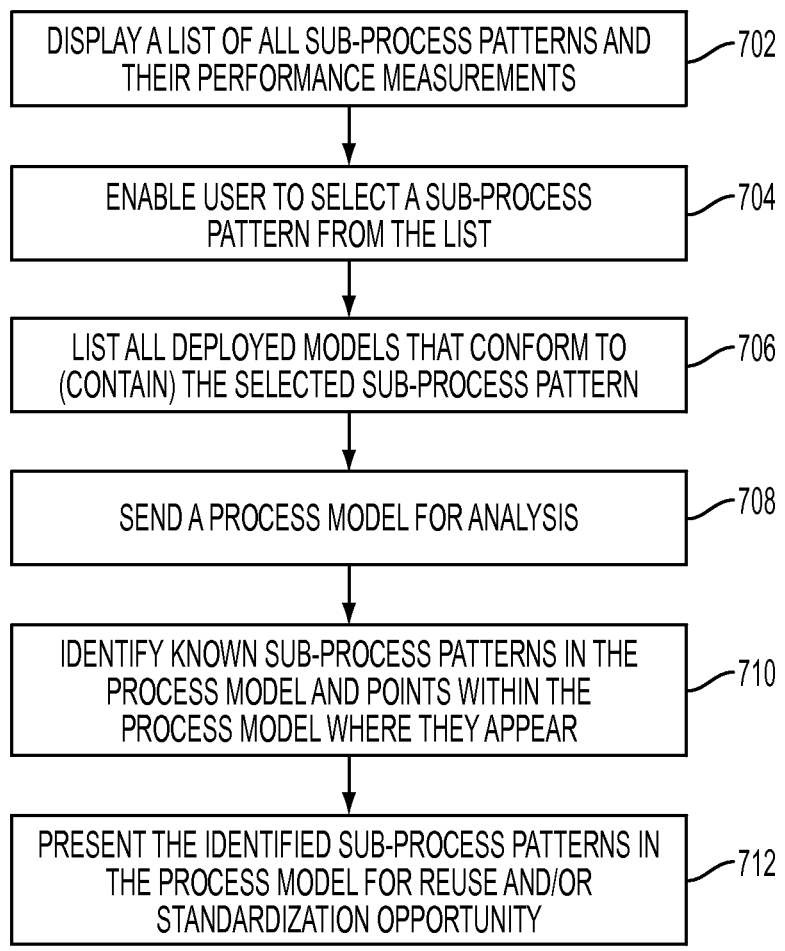
FIG. 7 illustrates a method for identifying one or more reuse opportunities in one embodiment of the present disclosure.

Offline measurement usage (e.g., FIG. 2 at 204) in one embodiment of the present disclosure may also include identifying reuse opportunities. FIG. 7 illustrates a method for identifying one or more reuse opportunities in one embodiment of the present disclosure. For instance, at 702, a PIP (e.g., FIG. 1 108) may display a list of all sub-process patterns and their performance measurements. At 704, a user may be enabled to select a sub-process pattern from the list, and in response to a selection, the PIP may list all deployed models that conform to it at 706. This functionality may allow the user to create new versions of deployed process models wherein sub-process patterns prone to negative behaviors are removed, discover sub-process patterns to use in new models, and compare deployed process models that reify sub-process patterns, decide if the differences between the models is necessary or not, and if unnecessary, replace the instances with one common re-useable sub-process.

The PIP may allow users to check if any sub-process within a new modeled process reifies a known sub-process pattern, allowing for reuse and standardization. For instance, at 708, the PIP may send the new model to the process analyzer as a query. At 710, the process analyzer may perform the same comparison it does when a new deployed model is added, but instead of adding the new model to the member list of sub-process patterns, it returns a list of sub-process patterns, and the points within the model that they appear, to PIP. At 712, the PIP may display the results and the user can identify reuse and/or standardization opportunities.

Figure 8:
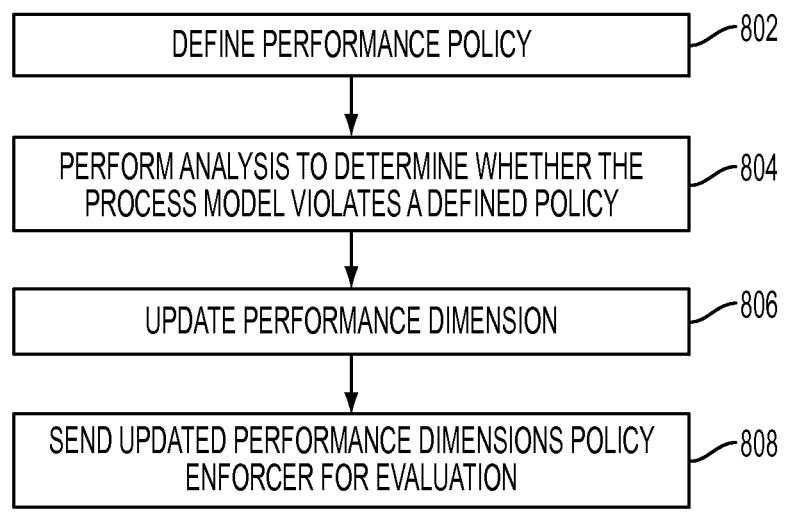
FIG. 8 illustrates runtime performance policy enforcement in one embodiment of the present disclosure.

In another aspect of the present disclosure, performance policies may be enforced. FIG. 8 illustrates runtime performance policy enforcement in one embodiment of the present disclosure. At 802, a user may define performance policy, for instance, using PPP (FIG. 1 110) or the like module or functionality. An example of a defined performance policy may include "no sub-process in this process shall take more than 2 days." At 804, upon deployment of a process model to the process server or like process model execution module, a static analysis may be performed to determine if the process model violates a defined policy. If there is a violation, appropriate action will be taken, where "appropriate" may vary based on the policy, the deployer, process server configuration, and other factors. Appropriate actions may be defined, for example, using rules technology. Static analysis allows analyzing the model as-is, without executing it. For example, the process analyzer (e.g., FIG. 1 at 104) may search for sub-process patterns in the model, and return found patterns and their performance characteristics to the policy enforcement engine (PE, e.g., shown in FIG. 1 at 114). The PE may check if the performance characteristics violate any policies. Such static analysis may be performed before executing the process, which for instance, may avoid running a process that violates a policy.

At 806, after the execution of each task in a running process, or at a set interval during the execution of a long-running task, the performance dimensions referenced by the performance policies applied to this process may be updated as needed to reflect the actual performance of this executing process. These updates may be created by the policy enforcer or the like functionality (e.g., FIG. 1 at 114) using events from the process execution server or the like functionality (e.g., FIG. 1 at 112). For example, a policy may require that the "likely duration of execution of sub-process x" be no greater than 24 hours. Consider the following example: sub-process x is composed of five tasks and conforms to pattern y. Further consider in the example that based on analysis previously done by the process analyzer (e.g., FIG. 1 at 104) the policy enforcer knows that tasks in pattern y each take roughly an equal amount of time to execute, so each task takes ⅕ of the execution time of the pattern. If x has been running for 15 hours and only executed two tasks thus far, the process enforcer can determine with a high probability that x will not complete within 24 hours and corrective action needs to be taken. The policy enforcer may dictate corrective action to the process execution server based on the business rules/policies contained within the policy enforcer.

At 808, updated performance dimensions may be sent to a policy enforcer (e.g., FIG. 1 114) or like module or functionality for evaluation. If a policy violation occurs, the policy enforcer module may dictate appropriate action to a process engine (e.g., FIG. 1 112) or like module or functionality that executes the process model. An appropriate action may be, to halt the execution of the process model, inform an administrator, compensate, execute alternate process model or sub-process, or other actions, or combinations of those actions.

Using the example above, if an instance of a process model is discovered to be in a state where it will take greater 2 days to complete, the policy in policy enforcer module may dictate to either follow an automated "expedite" process or alert a human to follow an expedited manual process.

Figure 9:
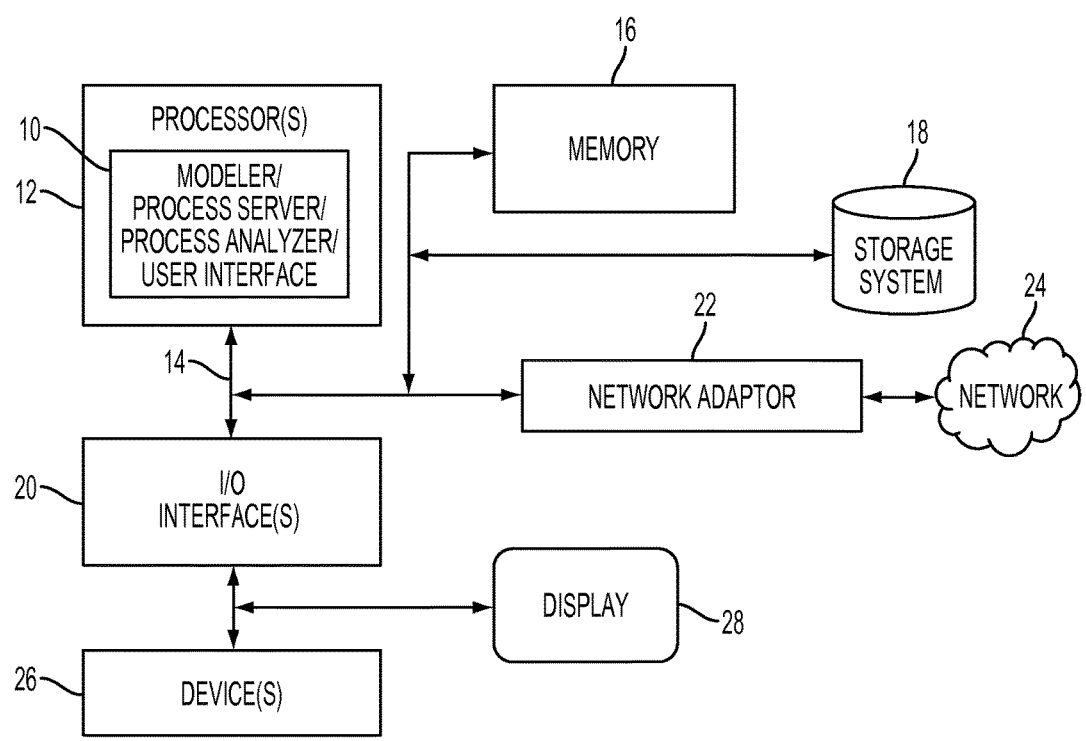
FIG. 9 illustrates a schematic of an example computer or processing system that may implement the performance measurement and policy enforcement system in one embodiment of the present disclosure.

FIG. 9 illustrates a schematic of an example computer or processing system that may implement the performance measurement and policy enforcement system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more or all of modeler, process server, process analyzer, user interface components 10 that performs the methods described herein. The modules 10 may be programmed into the integrated circuits of the processor 12, or loaded from memory 16, storage device 18, or network 24 or combinations thereof. Furthermore the modules 10 may be distributed among different processors over a network remotely on locally.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for process model performance measurement and process performance policy enforcement, comprising:
   receiving a deployed process model;
   discovering a common sub-process pattern in the deployed process model that is in common with at least one previously discovered sub-process pattern in a previously deployed process model;
   adding the deployed process model to a member list of the common sub-process pattern, if the deployed process model is not already in the member list, the member list of the common sub-process pattern comprising at least a plurality of process patterns that includes the common sub-process pattern, the common sub-process pattern associated with activities in the process patterns that reify the common sub-process pattern, the member list further comprising information that tells where a given pattern appears;
   receiving a signal of one or more events associated with a runtime instance of the deployed process model, the signal of one or more events describing one or more of start, stop, failure, exception, and configured events occurring in an execution of said runtime instance of the deployed process model, the signal of one or more events stored in an event data store;
   responsive to determining that the deployed process model or a sub-process within the deployed process model that caused the one or more events to be generated is in the member list of a common sub-process pattern, associating one or more performance dimensions impacted by the one or more events with the common sub-process pattern;
   computing performance measurement associated with the discovered common sub-process pattern based on the received one or more events;
   based on the performance measurement, identifying a composition of two or more services that individually produce positive performance but when composed together produce negative performance,
   wherein generating of the one or more events are configurable to be turned on and off at least for individual process models or instances of process models conforming to a given pattern; and
   displaying via a dashboard user interface, the common sub-process pattern and the performance measurement,
   wherein a plurality of common sub-process patterns are discovered and saved with respective performance measurements for creating and updating of new process models, performance of the new process models further predicted based on the respective performance measurements of the plurality of common sub-process patterns,
   wherein a sub-process pattern data store is rebuilt at set intervals.

2. The method of claim 1, further including discovering existence of negative performance pattern or positive performance pattern or combinations thereof in a newly deployed model based on the computed measurement.

3. The method of claim 1, wherein the method is performed for a plurality of deployed process models, wherein a plurality of sub-process patterns are discovered and the performance measurement is computed for each of the plurality of discovered sub-process patterns.

4. The method of claim 3, wherein a list of the plurality of sub-process patterns and associated performance measurement is presented for creating a new process model or improving an existing process model or combinations thereof.

5. The method of claim 3, further including predicting performance of a new process model based on the plurality of sub-process patterns and associated performance measurement.

6. The method of claim 3, further including enforcing one or more defined policies on the deployed process model based on the plurality of sub-process patterns and associated performance measurement.

7. The method of claim 3, wherein the events are configurable.

8. The method of claim 1, wherein the performance measurement includes a performance pattern describing behavior being exhibited by the sub-process patterns with respect to a performance dimension.

9. The method of claim 1, wherein the performance measurement includes probability distribution of an event recognized to impact a performance dimension of the deployed process model.

10. A system for process model performance measurement and process performance policy enforcement, comprising:
    a processor;
    a process analyzer operable to execute on the processor and further operable to discover a common sub-process pattern in a deployed process model that is in common with at least one previously discovered sub-process pattern in a previously deployed process model,
    the process analyzer further operable to add the deployed process model to a member list of the common sub-process pattern, if the deployed process model is not already in the member list, the member list of the common sub-process pattern comprising at least a plurality of process patterns that includes the common sub-process pattern, the common sub-process pattern associated with activities in the process patterns that reify the common sub-process pattern, the member list further comprising information that tells where a given pattern appears, the process analyzer module further operable to receive a signal of one or more events associated with a runtime instance of the deployed process model, the signal of one or more events describing one or more of start, stop, failure, exception, and configured events occurring in an execution of said runtime instance of the deployed process model, the signal of one or more events stored in an event data store, responsive to determining that the deployed process model or a sub-process within the deployed process model that caused the one or more events to be generated is in the member list of the common sub-process pattern, the process analyzer is operable to associate one or more performance dimensions impacted by the one or more events with the common sub-process pattern, and compute performance measurement associated with the discovered common sub-process pattern based on the received one or more events, wherein the process analyzer discovers a plurality of common sub-process patterns in a plurality of deployed process models and computes performance measurement associated with each of the plurality of common sub-process patterns, and wherein the process analyzer identifies negative performance patterns and positive performance patterns among the plurality of common sub-process patterns based on the computed performance measurement, wherein generating of the one or more events are configurable to be turned on and off at least for individual process models or instances of process models conforming to a given pattern a dashboard user interface displaying the common sub-process pattern and the performance measurement, wherein a plurality of common sub-process patterns are discovered and saved with respective performance measurements for creating and updating of new process models, performance of the new process models further predicted based on the respective performance measurements of the plurality of common sub-process patterns, wherein a sub-process pattern data store is rebuilt at set intervals.

11. The system of claim 10, further including storage device for storing the plurality of deployed process models, the one or more events, and the computed performance measurement associated with each of the plurality of common sub-process patterns.

12. The system of claim 10, further including a user interface module operable to present performance alerts based on the computed performance measurement.

13. The system of claim 10, further including a process improvement module operable to allow a user to create a new process model or improve an existing process model or combinations thereof, based on one or more of the plurality of common sub-process patterns and the associated computed performance measurement and the identified negative performance patterns and positive performance patterns.

14. The system of claim 13, further including a performance policy module operable to enable a user to add policy specification associated with a process model for deploying.

15. The system of claim 10, further including a process server operable to execute the deployed process model and fire the one or more events associated with one or more performance dimensions of the deployed process model in runtime, the process server further operable to enforce one or more policies based on the computed performance measure.

16. A system for process model performance measurement and process performance policy enforcement, comprising:

a processor;

a modeler operable to create a process model and one or more policies associated with the process model;

a process server operable to deploy and execute the process model, the process server further operable to fire one or more events associated with runtime execution of the process model, the one or more events describing one or more of start, stop, failure, exception, and configured events occurring in an execution of said runtime instance of the process model to provide notification of occurrence of said one or more of start, stop, failure, exception, and configured events, the signal of one or more events stored in an event data store;

a process analyzer operable to discover a sub-process pattern in the process model that is common with previously discovered sub-process pattern, the process analyzer further operable to add the process model to a member list of the common sub-process pattern, if the process model is not already in the member list, the member list of the common sub-process pattern comprising at least a plurality of process patterns that includes the common sub-process pattern, the common sub-process pattern associated with activities in the process patterns that reify the common sub-process pattern, the member list further comprising information that tells where a given pattern appears, responsive to determining that the process model or a sub-process within the process model that caused the one or more events to be generated is in the member list of a common sub-process pattern, the process analyzer further operable to associate one or more performance dimensions impacted by the one or more events with the common sub-process pattern, the process analyzer further operable to compute performance measure associated with the discovered sub-process pattern based on the fired one or more events, wherein the modeler further uses the discovered sub-process pattern and associated performance measure to create a new process model, or improve an existing process model, or combinations thereof, wherein the process server further enforces the one or more policies based on the computed performance measure, wherein generating of the one or more events are configurable to be turned on and off at least for individual process models or instances of process models conforming to a given pattern, a dashboard user interface displaying the common sub-process pattern and the performance measurement, wherein a plurality of common sub-process patterns are discovered and saved with respective performance measurements for creating and updating of new process models, performance of the new process models further predicted based on the respective performance measurements of the plurality of common sub-process patterns, wherein a sub-process pattern data store is rebuilt at set intervals.

17. A non-transitory computer readable storage medium storing a program of instructions executable by a machine to perform a method of process model performance measurement and process performance policy enforcement, comprising:

receiving a deployed process model;

discovering a common sub-process pattern in the deployed process model that is in common with at least one previously discovered sub-process pattern in a previously deployed process model;

adding the deployed process model to a member list of the common sub-process pattern, if the deployed process model is not already in the member list, the member list of the common sub-process pattern comprising at least a plurality of process patterns that includes the common sub-process pattern, the common sub-process pattern associated with activities in the process patterns that reify the common sub-process pattern, the member list further comprising information that tells where a given pattern appears;

receiving a signal of one or more events associated with a runtime instance of the deployed process model, the signal of one or more events describing one or more of start, stop, failure, exception, and configured events occurring during an execution of said runtime instance of the deployed process model, the signal of one or more events stored in an event data store;

responsive to determining that the deployed process model or a sub-process within the deployed process model that caused the one or more events to be generated is in the member list of the common sub-process pattern, associating one or more performance dimensions impacted by the one or more events with the common sub-process pattern; and computing performance measurement associated with the discovered common sub-process pattern based on the received one or more events, wherein generating of the one or more events are configurable to be turned on and off at least for individual process models or instances of process models conforming to a given pattern, displaying via a dashboard user interface, the common sub-process pattern and the performance measurement, wherein a plurality of common sub-process patterns are discovered and saved with respective performance measurements for creating and updating of new process models, performance of the new process models further predicted based on the respective performance measurements of the plurality of common sub-process patterns, wherein a sub-process pattern data store is rebuilt at set intervals.

18. The computer readable storage medium of claim 17, further including discovering existence of negative performance pattern or positive performance pattern or combinations thereof in a newly deployed model based on the computed measurement.

19. The computer readable storage medium of claim 17, wherein the method is performed for a plurality of deployed process models, wherein a plurality of sub-process patterns are discovered and the performance measurement is computed for each of the plurality of discovered sub-process patterns.

20. The computer readable storage medium of claim 19, wherein a list of the plurality of sub-process patterns and associated performance measurement is presented for creating a new process model or improving an existing process model or combinations thereof.

21. The computer readable storage medium of claim 19, further including predicting performance of a new process model based on the plurality of sub-process patterns and associated performance measurement.

22. The computer readable storage medium of claim 19, further including enforcing one or more defined policies on the deployed process model based on the plurality of sub-process patterns and associated performance measurement.

23. The computer readable storage medium of claim 19, wherein the events are configurable.

24. The computer readable storage medium of claim 17, wherein the performance measurement includes a performance pattern describing behavior being exhibited by the sub-process patterns with respect to a performance dimension.

25. The computer readable storage medium of claim 17, wherein the performance measurement includes probability distribution of an event recognized to impact a performance dimension of the deployed process model.

* * * * *